Patented May 15, 1951

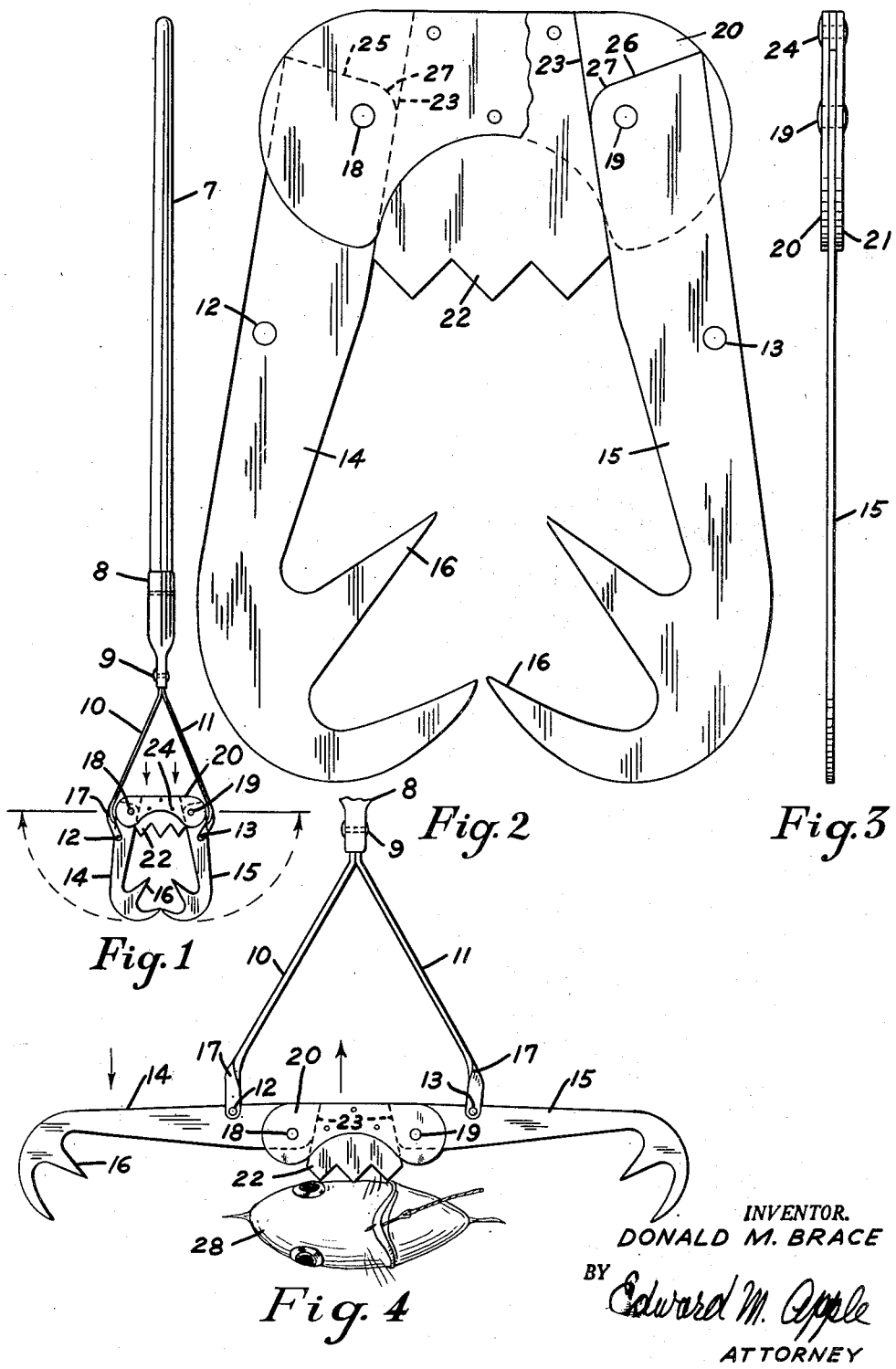

2,553,235

UNITED STATES PATENT OFFICE 2,553,235

SPRING GAFF

Donald M. Brace, St. Clair Shores, Mich.

Application March 2, 1946, Serial No. 651,524

2 Claims. (Cl. 294—110)

This invention relates to fishing tackle, and has particular reference to a device for retrieving a fish which has been caught on a hook, and which has been maneuvered into position alongside of a boat or the like.

An object of the invention is the provision of a device of the character indicated, which is spring actuated and automatically operable when brought into contact with a fish or other object to be retrieved.

Another object of the invention is the provision of a device of the character indicated, which is constructed and arranged in such manner that it may be held in one hand, and may be cocked by placing the foot between the spring arms.

Another object of the invention is the provision of a device of the character indicated, which is constructed and arranged in such manner that when the device is tripped from the cocked position, it will effect a substantial grappling action.

The foregoing and other objects and advantages of the invention will become more apparent as the description proceeds, reference being made from time to time to the accompanying drawings forming part of the within disclosure, in which drawings:

Fig. 1 is an elevational view of a device embodying the invention.

Fig. 2 is an enlarged detail view of the jaws and supporting plates.

Fig. 3 is an elevational view of the edge of the elements shown in Fig. 2.

Fig. 4 is an enlarged view of the device shown in Fig. 1, when it is in cocked position ready to retrieve a fish.

Referring now more particularly to the drawings, it will be understood that in the embodiment herein disclosed, my device consists of a handle 7 having a ferrule 8 at one end, to which is mounted by a rivet 9 or other suitable means, a pair of diverging spring arms 10 and 11, to the ends of which are pivoted as at 12 and 13, the grappling jaws 14 and 15.

The jaws 14 and 15 are provided with sharp tines 16, which upon the pivoting of the jaws 14 and 15 inwardly, effect an inward and upward motion. The spring arms 10 and 11 are bent as at 17 so that the end thereof may lie in a plane parallel with the jaws 14 and 15. The jaws 14 and 15 are pivoted as at 18 and 19, between a pair of matched plates 20 and 21.

A serrated trigger member 22, having inclined edges 23, is also positioned between the plates 20 and 21, and secured thereto by means of rivets 24. The inclined edges 23 of the trigger member 22 serve as abutments for the ends 25 and 26 of the jaws 14 and 15, when the device is in its cocked position as shown in Fig. 4.

It will be noted that the pivot points 18 and 19 are off center, so that the jaws 14 and 15 may be held in cocked position by spring arms 10 and 11, and so that the spring arms 10 and 11 may effectually close the jaws 14 and 15 after the pivot points 12 and 13 have traveled past the center line of the pivot points 18 and 19, on the closing motion of the jaws 14 and 15.

It will also be noted that an arc 27 is formed on the inside corner of the jaws 14 and 15, so that the jaws may readily be rotated about the pivot points 18 and 19.

The operation of the device is as follows:

When a fisherman has a large fish on the end of his line, and has maneuvered the fish to the side of the boat or the like, he takes my improved spring gaff in one hand, and places one foot between the spring arms 10 and 11, forcing the trigger 22 away from him. The movement of the trigger member 22 away from the operator, causes the jaws 14 and 15 to rock outwardly and inwardly on their pivot points 18 and 19, and under the influence of the spring arms 10 and 11. When the jaws 14 and 15 reach the position shown in Fig. 4, the ends 25 and 26 abut against the edges 23 of the trigger member 22, and will remain in this position until the device is tripped.

The tripping operation is the reverse of the cocking operation just described. In tripping the device, the trigger member 22 is forcibly moved against the fish 28 (Fig. 4), so that the impact of the trigger 22 with the body of the fish 28 causes the trigger 22 to move upwardly, at the same time causing the fixed ends of the jaws 14 and 15 to move in the same direction and pivot about the pivots 18 and 19 and 12 and 13, under the influence of the spring arms 10 and 11. After the pivot points 18 and 19 have passed the center line of the pivot points 12 and 13, the free ends of the jaws 14 and 15 will move inwardly to imbed the hooks 16 in the body of the fish, so that it may not escape.

Having described the invention, what I claim and desire to secure by Letters Patent is:

1. In a device of the character described, including a pair of diverging spring arms, having jaws pivoted to said arms, the combination of a pair of matched plates covering the ends of and pivotally supporting said jaws, and a flat serrated trigger member secured between said plates and having inclined edges adapted to serve as abutments for the ends of said jaws.

2. The combination defined in claim 1 in which the adjacent ends of said jaws have short arcs formed at one corner thereof adapted to ride on the inclined edges of said trigger to effect a sensitive cocked position for said jaws when in the open position.

DONALD M. BRACE.

REFERENCES CITED

The following references are of record in the file of this patent:

UNITED STATES PATENTS

| Number | Name | Date |
|---|---|---|
| 168,335 | Jencks | Oct. 5, 1875 |
| 674,865 | Harrington | May 28, 1901 |
| 689,743 | Norlund | Dec. 24, 1901 |
| 1,008,724 | Lenderman | Nov. 14, 1911 |
| 1,534,954 | Holtz | Apr. 21, 1925 |